United States Patent
Muldoon

(10) Patent No.: US 6,508,007 B1
(45) Date of Patent: Jan. 21, 2003

(54) DEVICE FOR MEASURING BOUNCE, LOFT AND LIE OF GOLF CLUB

(75) Inventor: Douglas P. Muldoon, Northville, MI (US)

(73) Assignee: Ed Mitchell, Dayton, OH (US)

( * ) Notice: Subject to any disclaimer, the term of this patent is extended or adjusted under 35 U.S.C. 154(b) by 0 days.

(21) Appl. No.: 09/901,529

(22) Filed: Jul. 9, 2001

(51) Int. Cl.[7] ................................................ G01B 5/24
(52) U.S. Cl. ...................................................... 33/508
(58) Field of Search .......................... 33/508, 1 N, 533, 33/534, 613, 645, DIG. 1; 473/244, 245, 246, 247, 248, 282

(56) References Cited

U.S. PATENT DOCUMENTS

| | | | | |
|---|---|---|---|---|
| 2,546,426 A | * | 3/1951 | Bryant | 33/508 |
| 2,973,581 A | * | 3/1961 | Rhodehamel | 33/508 |
| 3,093,919 A | * | 6/1963 | Holtz | 40/621 |
| 3,822,477 A | * | 7/1974 | Collins | 33/174 F |
| 4,858,332 A | * | 8/1989 | Thomas | 33/508 |
| 5,105,550 A | * | 4/1992 | Shenoha | 33/508 |
| 5,421,098 A | | 6/1995 | Muldoon | |
| 5,884,409 A | | 3/1999 | Muldoon | |
| 6,430,829 B1 | * | 8/2002 | Williamson et al. | 33/508 |
| 6,449,860 B1 | * | 9/2002 | Nakai et al. | 33/508 |
| 2002/0123383 A1 | * | 9/2002 | Cameron | 473/131 |

* cited by examiner

Primary Examiner—Diego Gutierrez
Assistant Examiner—Tania C. Courson
(74) Attorney, Agent, or Firm—R. William Graham

(57) ABSTRACT

A device for measuring bounce angle, bounce width, loft and lie of a golf club includes a registering aid for registering the golf club, a bounce measurer operably associated with the registration aid to enable a bounce measurement to be taken, a loft measurer operably associated with the registration aid to enable a loft measurement to be taken, and a lie measurer operably associated with the registration aid to enable a lie measurement to be taken.

33 Claims, 5 Drawing Sheets

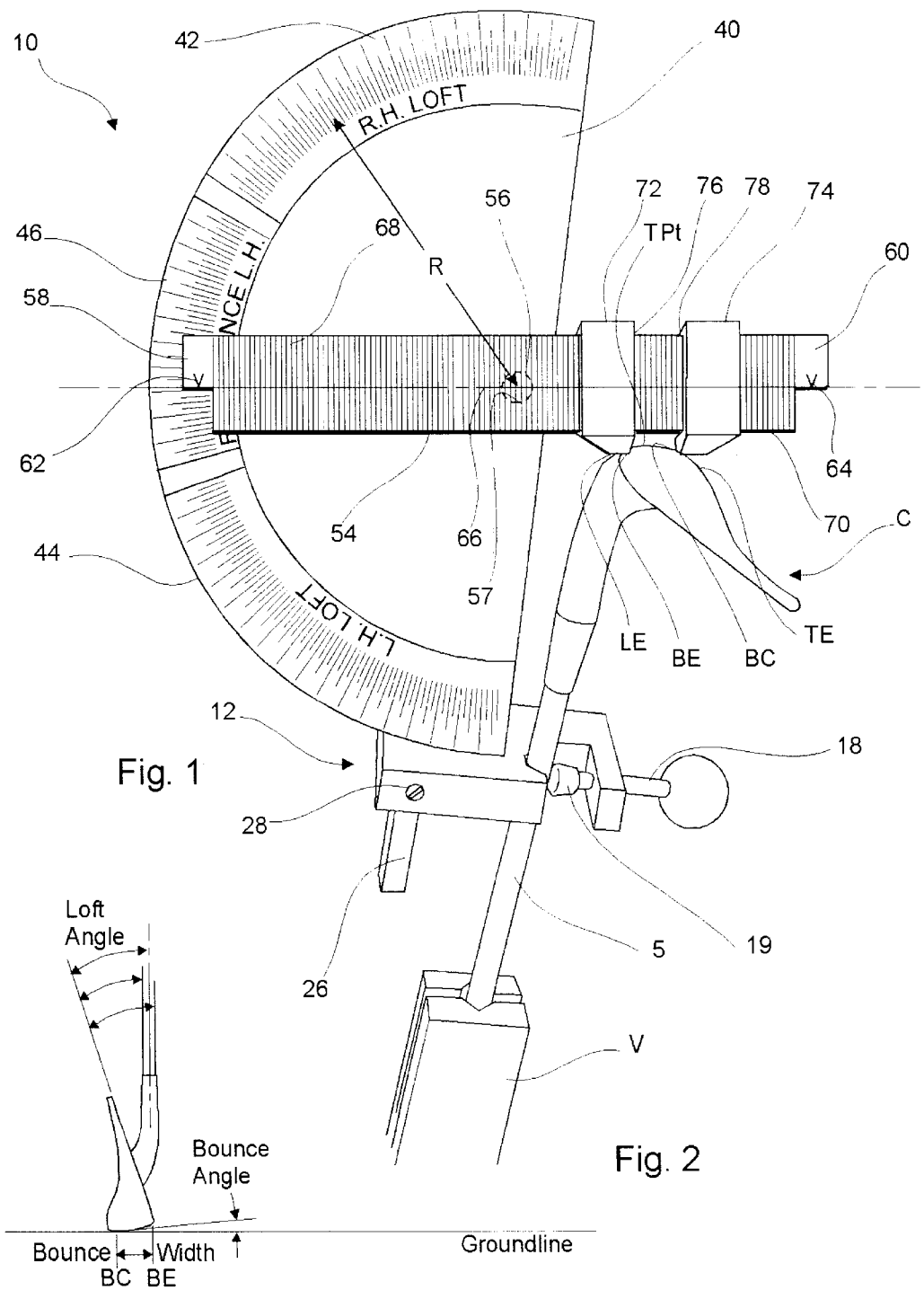

US 6,508,007 B1

DEVICE FOR MEASURING BOUNCE, LOFT AND LIE OF GOLF CLUB

BACKGROUND OF THE INVENTION

This invention relates to a measurement device for golf clubs. More particularly, the invention is directed to a device for measuring the bounce, loft and lie of a golf club.

A golf club includes a shaft and a club head and falls into one of three categories: woods (a modern day misnomer as these are typically metal/alloy), irons and putters. Irons and woods are grouped by loft angle. Woods commonly are formed with 8.degree.–27.degree. loft angles. Irons with low loft angles, e.g., 20.degree.–30.degree., are classified as long irons while irons with large loft angles, e.g., 40.degree.–50.degree., are classified as short irons. Irons are typically identified from long to short, i.e., 1, 2, 3, 4, 5, 6, 7, 8, 9, PW (pitching wedge), SW (sand wedge), and LW (lob wedge).

A side from length and weight of the club, variance in bounce, loft and lie of a golf club affect the playability of the club. Traditionally, bounce angle was the distance between the ground and the line which connects the leading edge of the sole with the trailing, or effective trailing, edge of the sole. The loft, lie and bounce angle impacts playability, launch angle and spin rate. These three factors seem to play particular importance in "personalizing" a golf club.

It has been conventionally thought, lie angle is the angle between the center line of the hosel bore and the round line when the head of the club is disposed on the club. The lie angle is important because if, for example, the club's sole is angled upward when the club head impacts the ball, the face of the club head will be aimed to the left of the medial line of the fairway. The ball will travel in this left-of-center direction because that is the direction in which it is aimed. On the other hand, if the club's sole is angled in a downward direction, the opposite effect will be obtained wherein the golf club head faces to the right and the travel of the ball will go to the right of the medial line of the fairway.

The other angle of face of the golf club head relative to the shaft is the loft angle. The loft angle is the backward slant of the face of a golf club head. The greater the angle, the greater the loft of the ball after being struck by the club. While the loft of clubs often determines their angle in a conventional way, for example, a "5 iron" has a greater loft than a "4 iron," these degrees are not absolute for each set of clubs. One golfer may use a "six iron" to achieve a certain degree of loft of the ball, whereas another golfer, using the same club, may achieve a different degree of loft. This is because the grip and stance of golfers differs such that upon impact of the club face on the ball, the loft angle may be different from one golfer to the other. This angle is personalized to meet the particular habits of the individual golfer.

Accordingly bending devices have been made to change these angles in order to fit a club to the golfer. Prior to bending a club, an accurate measuring device is imperative in order to determine how much alteration is required.

The present invention overcomes the problem of the lack of a reliable system that provides not only a method of measuring the optimum loft and lie of a golf club for a particular golfer, but also the bounce angle in order to take into account the alteration of the particular club's lie and loft angle to meet the personalized needs of the golfer. Prior approaches to adjusting the loft and lie angles to fit the individual needs of the golfer failed to provide a suitable device for measuring bounce angle in order to adequately perform a multi-task of measuring loft and lie of a golf club.

SUMMARY OF THE INVENTION

The present invention overcomes the problems of the current state of the art for measuring golf clubs. The variables of bounce, loft and lie of a golf club are of primary focus in the present invention. It is an object to improve the way to measure bounce, loft and lie of a golf club. It is another object to provide a device for measuring bounce, loft and lie of a golf club.

The present invention provides for measuring bounce angle in a novel manner wherein the bounce angle is formed by the horizontal sole plane that is right angle to a club's vertical shaft plane that intersects the leading bounce edge (beginning of sole's camber radius) of the club and the trailing bounce edge (lowest point on sole's camber radius). The invention provides for lie angle to be calculated between the vertical shaft plane and a horizontal plane parallel to a score line of the club face. Further, the invention provides for loft to be calculated using the present invention.

Accordingly, the invention is directed to a device for measuring bounce angle, bounce width, loft and lie of a golf club. The device includes a shaft clamp for holding a golf club in an adjustably fixable position, a bounce measurer operably associated with the shaft clamp, a loft measurer operably associated with the shaft clamp and a lie measurer operably associated with the shaft clamp. The bounce measurer can be movably connected to the loft measurer. The loft measurer and lie measurer are movably interconnected to the shaft clamp. The device includes an alignment piece removably configured to be disposed adjacent a face of the golf club and to extend perpendicular therefrom. In a preferred embodiment, the device is further characterized to include the ability to measure right and left-handed clubs.

In a broader context, the invention is directed to a device and method for measuring bounce. The invention also provides for a device and method for measuring loft and lie.

DESCRIPTION OF THE DRAWINGS

The invention will be explained in conjunction with an illustrative embodiment shown in the accompanying drawing, in which FIG. 1 is a perspective view of a device of the present invention measuring bounce;

FIG. 2 is an end view illustrating loft angle, bounce angle and bounce width of a golf club;

DESCRIPTION OF A PREFERRED EMBODIMENT

Figures 4, 5:
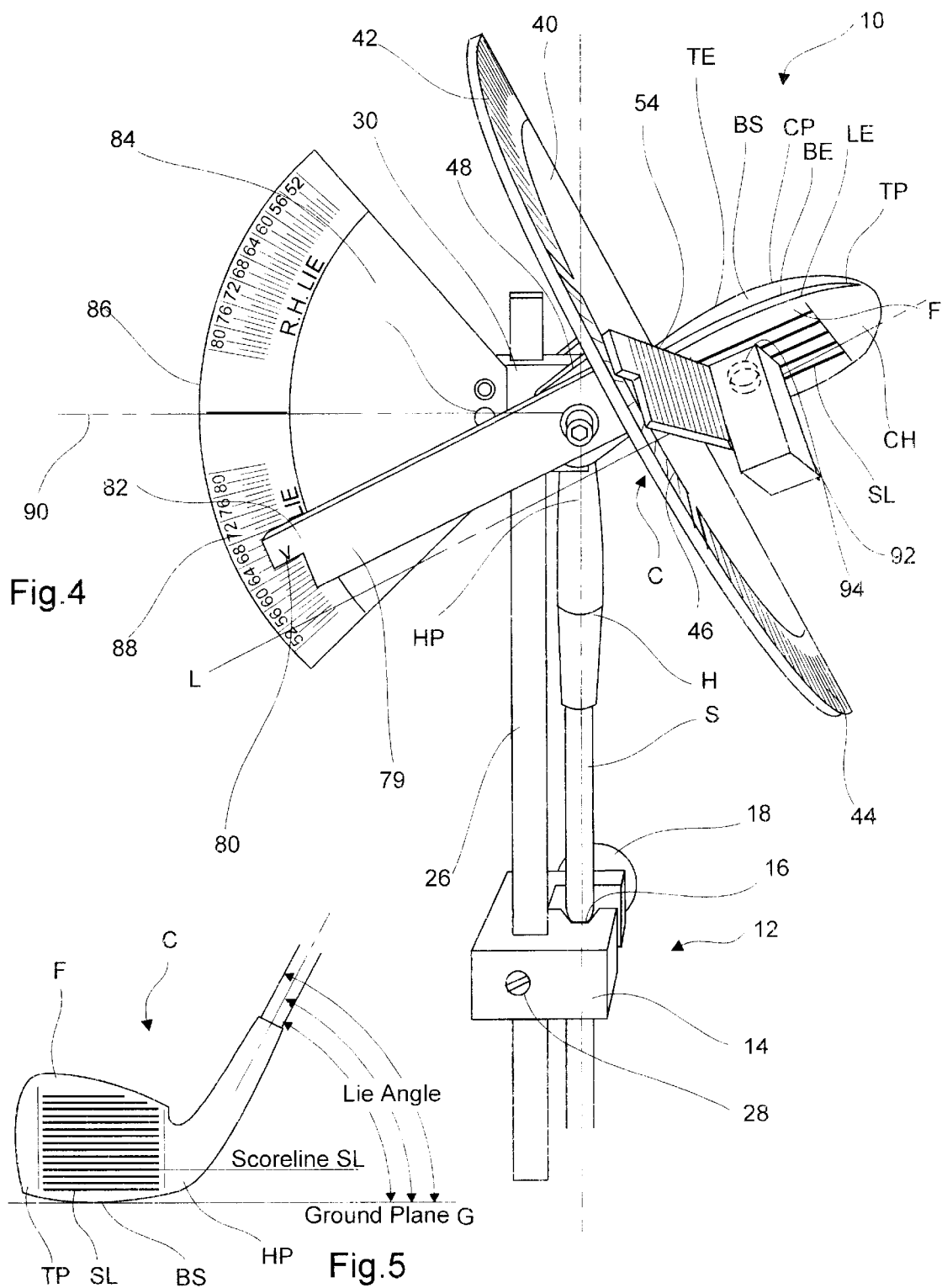
FIG. 4 is a perspective view of a device of the present invention measuring lie.
FIG. 5 is an side view illustrating lie angle of a golf club.

Referring now to the drawings, the device of the present invention is generally referred to by the numeral 10. As seen in FIGS. 4 & 5, for example, a conventional golf club C includes a club head CH and a shaft S. For convenience of illustration, the standard grip on the upper end of the shaft S is omitted from the drawings. The club head CH includes a hosel portion B in which the shaft S is inserted and secured to a heel portion HP, and further has a central portion CP, and a toe portion TP. The club head CH has a curved bottom surface (or sole) BS and a flat face F which is adapted to strike a golf ball. The face F is provided with conventional score lines SL. The golf club C is typically designed so that the score lines SL are horizontal to the ground plane G when the club C is held properly. The sole BS includes a leading edge LE and a trailing edge TE. For purposes of using the invention herein the shaft S can be fixed in a vice V.

Figures 7, 8:
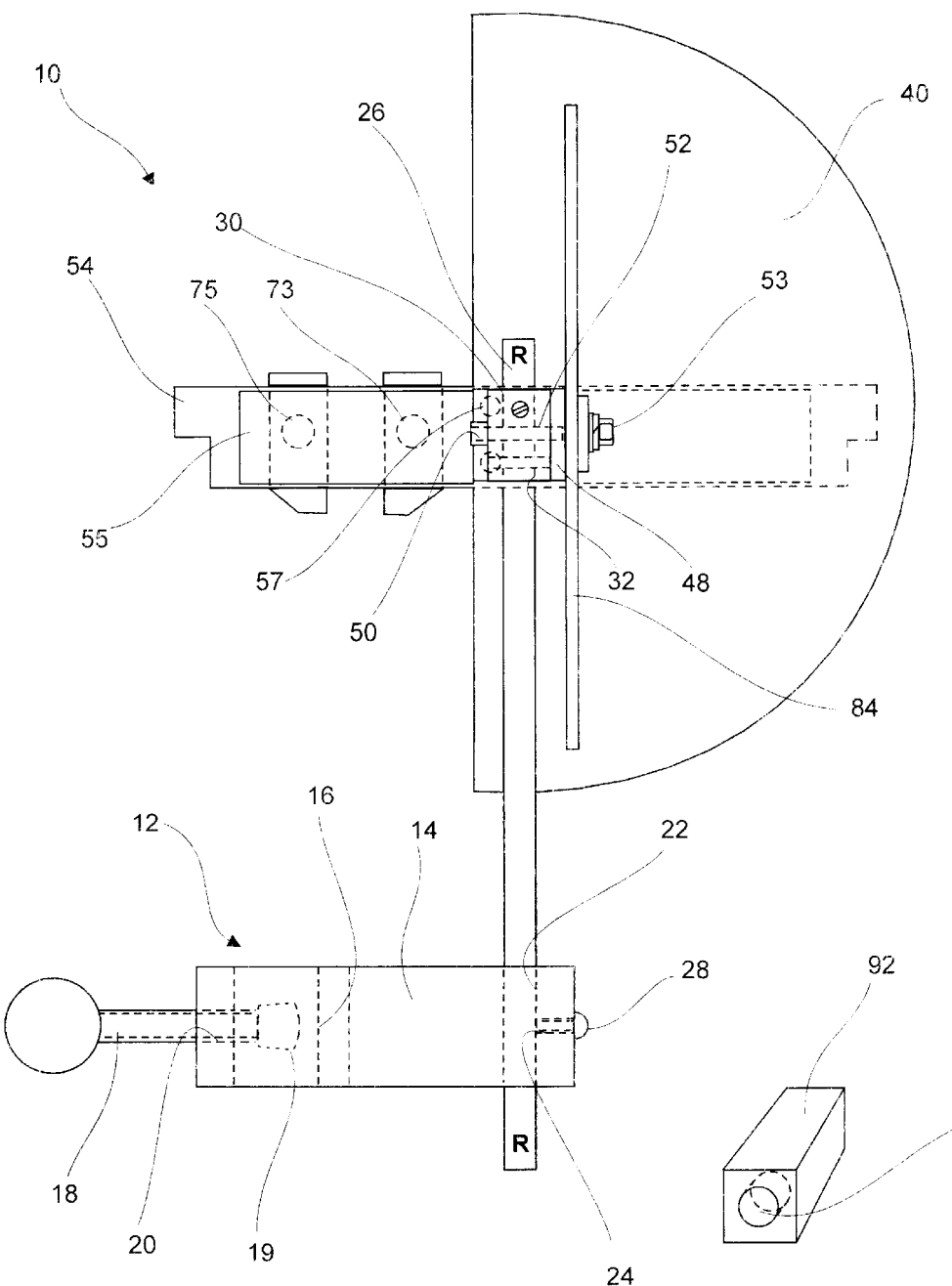
FIG. 7 is a back view of the invention configured for a right-handed club.
FIG. 8 is an alignment piece of the present invention.

The device 10 measures bounce angle, bounce width, loft and lie of the golf club C, each of which will be described. The device 10 includes suitable means for registering the golf club C to the device 10 which is here shown to have a shaft clamp 12 comprised of a block 14 having a club receiving surface 16, a locking screw 18 which is threadably received through a threaded surface 20 (see FIG. 7) of the block 14 and has a rubber end cap 19 to releasably lock the shaft clamp 12 in a desired position. The block 14 further includes a shaft receiving surface 22 and a set screw receiving surface 24 in communication therewith. A shaft 26 is provided which extends into receiving surface 22. A set screw 28 threads through the set screw receiving surface 24 to tighten the shaft 26 in a desired place. The set screw 28 preferably has a Teflon surface coating which permits the shaft to be frictionally slid to a desired position without unscrewing the set screw 28. Optionally, to perform this function, a spring loaded bearing system, e.g., a spring-loaded ball plunger, can be employed to achieve a similar result. The receiving surfaces 16 and 22 are axially aligned in a parallel manner such that when the club shaft S and the shaft 26 are fixably disposed in the respective surfaces 16 and 22, the shafts S and 26 are aligned in a parallel relation to one another.

To another portion of the shaft 26 which is longitudinally displaced from the block 14 there is another block 30 which is also part of the means for registering. The block 30 includes a shaft receiving surface 32. The shaft 26 includes a stop 34 extending radially therefrom to prevent the block 30 from sliding beyond a predetermined position and a set screw receiving surface 36 in the block 30 with a set screw 38 can be used to lock the block 30 in place on the shaft 26 in a clamping like effect. Likewise, to perform this function, a spring loaded bearing system, e.g., a spring-loaded ball plunger, can be employed to achieve the similar result.

Figure 3:
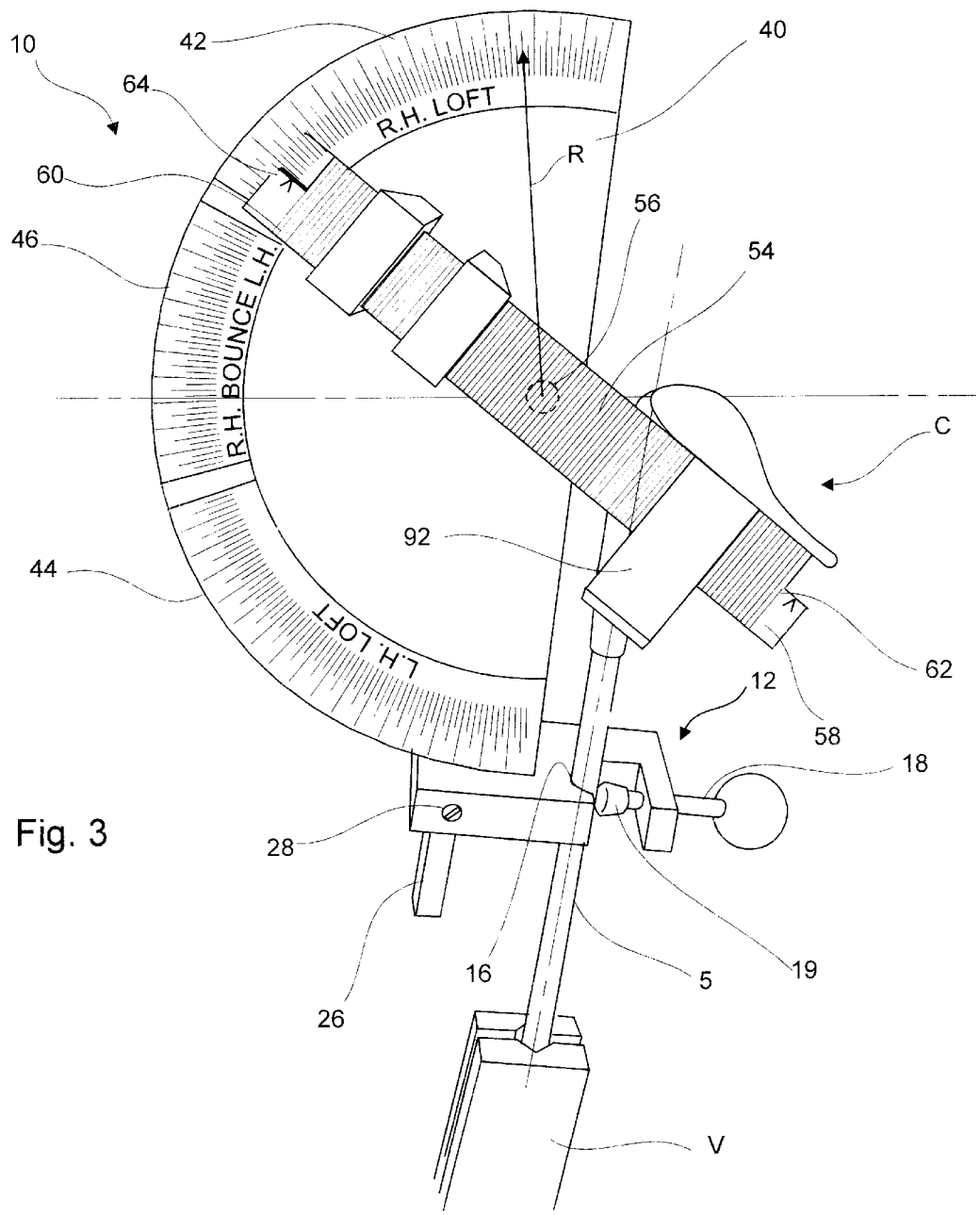
FIG. 3 is a perspective view of a device of the present invention measuring loft.

Pivotally mounted to a front portion of the block 30 is a loft and bounce measurement plate 40 formed in a half circular shape but need not be so and can take on other shapes. By virtue of the design of the present invention, it can be understood that the parts described herein can be reversed to accommodate the measurement of left-handed clubs as well as right-handed clubs. Accordingly as seen in FIGS. 1, 3 and 4, one portion 42 of the plate 40 is incrementally marked with degree indications for right-handed club measurements while another portion 44 is marked for left-handed clubs. A central portion 46 of the plate 40 is provided for measuring bounce angle as determined herein. The plate 40 has arms 48 which extend from its back and which include coaxially aligned bores 50 through which a locking pivot bolt 52 extends and is secured by nut 53. The markings within portions 42, 44 and 46 are defined about a common arc radius R. The arms 48 permit the plate 40 to pivot about a central axis of the bolt 52 and remains in register with respect to the shaft S once registered.

Referring to FIG. 1, a pointer 54 is pivotally disposed on the front of the plate 40 (here shown to be rotatably disposed). The pointer 54 moves about a center point 56 of radius R by a connection between the plate 40 and pointer 54. The ends 58 and 60 are configured with a marked notched portions 62 and 64, respectively, said marked notched 62, 64 are shown here to align with a centerline 66 which extends through the pointer 54 and center point 56. The marked notched portions 62 and 64 move about the radius R such that readings of loft and bounce angle can be achieved by viewing the degree marking on the plate 40 adjacent the marked notched portion 62 or 64.

The pointer 54, preferably of a metal material, is generally flat and rectangular and includes a plurality of incrementally spaced markings 68, here shown as lines perpendicular to the centerline 66 which are in sixteenth inch increments. Two slidably mounted measuring bars 72 and 74 are disposed on the pointer 54. The bars 72 and 74 include magnetic portions 73 and 75, respectively, to magnetically connect to the pointer 54. The bars 72 and 74 have an edge 76 an edge and 78, respectively, which are perpendicular to the centerline 66 and permit reading a pair of the markings 68. As further seen in FIGS. 1, 2 and 4, the edge 76 and the edge 78, respectively, can align with a bounce edge BE, which can be the leading edge LE but is not necessarily so and is meant to include the point on the sole BS starting from the leading edge LE where the radius begins, and the bounce contact point BC which likewise can be a trailing edge TE but is meant to include the lowest sole camber radius point, where between the leading bounce edge BE and bounce contact point BC a distance to be measured is the bounce width. With the edge's 76 and 78 contacting the leading bounce edge BE and bounce contact point BC, respectively, the pointer 54 is thus disposed such that the marked notched portion 62 can provide a bounce angle reading. Also, this can be accomplished by taking a midpoint between the leading bounce edge BE and bounce contact point BC about which a tangential point TPt exists on the sole BS wherein the pointer 54 can be tangentially aligned such that the marked notched portion 62 can provide a like bounce angle reading. Either form of measurement can be accomplished through the invention. It is noted that the pointer 54 is held to the plate 40 by a magnetic portion 57 which is shown here as part of the plate 40 but can be part of the pointer 54. A spacer 55 made of a plastic material, for example, can be adhered to a back surface of the pointer 54 to aid the slidability between the plate 40 and pointer 54.

An alignment aid is provided which is shown here as a rectangular block 92, which can be a square, and includes six perpendicular faces and preferably includes a magnetic end 94. A unique aspect of the block 92 is that it permits registration of a club face with various configurations of offset and non-offset hosel positions and face progressions. In this way, the end 94 can be magnetically connected to the face F of the club C and rotated in a manner so that an ed edge thereof is parallel and aligned with a score line SL and is perpendicular to the face F. The plate 40 can be pivoted so the pointer 54 can be brought flush with a face of the block 92 and the plate 40 is in turn thus placed in register with the shaft S and face F of the club C. The shaft 26 can be raised or lowered such that an edge 70 of the pointer 54 can be brought flush with the face of the club C. Upon so doing, the marked notched portion 64 permits a loft angle to be obtained. While the particular alignment aid is shown, it is contemplated that other configurations may exist or that a part of the device 10, such as plate or pointer being positioned adjacent the club face to accomplish registration.

Figure 6:
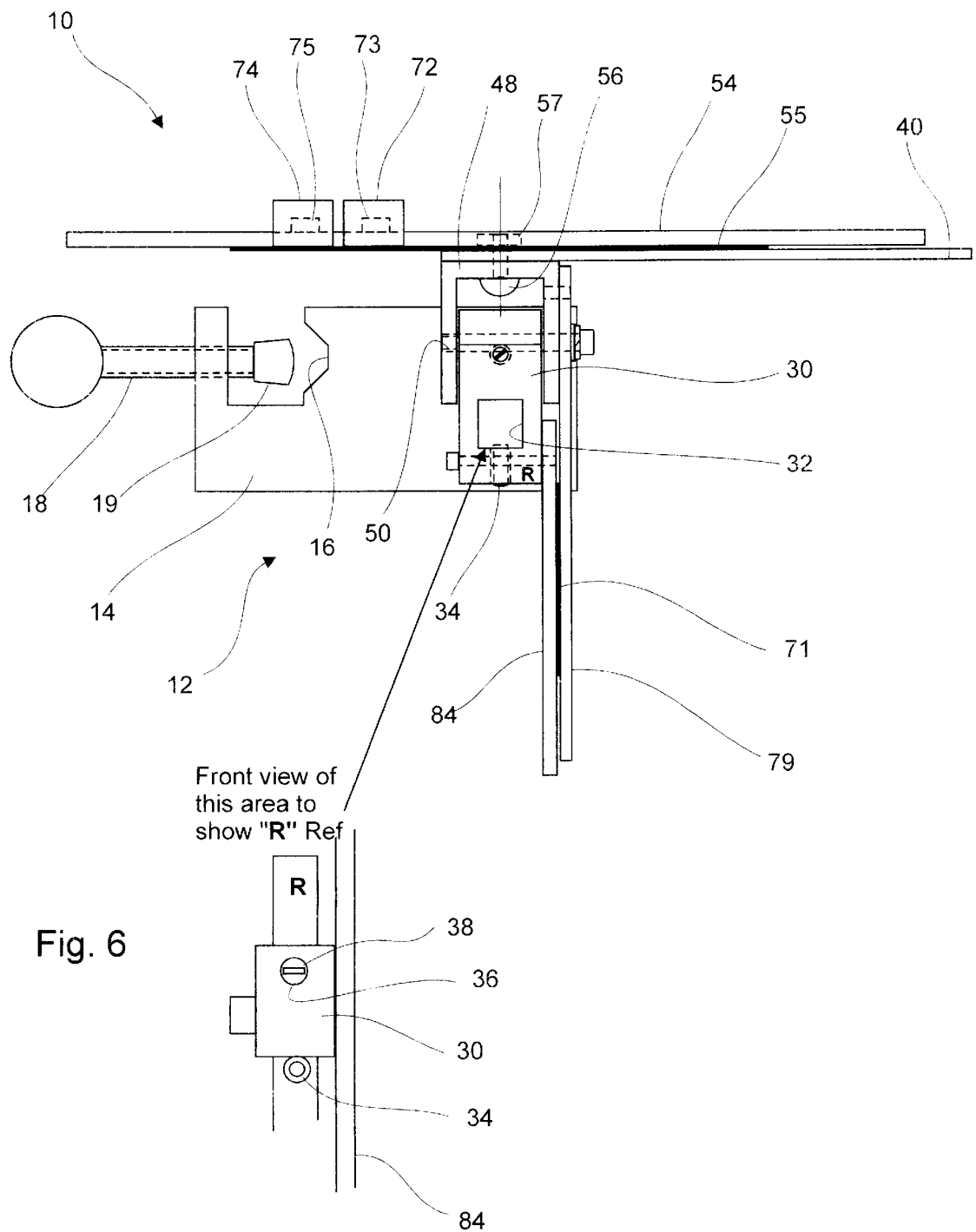
FIG. 6 is a top view showing an exploded portion from the front configured for receipt of a right-handed club.

The principle to determine lie in the present invention is that a pointer 79 which is generally flat and rectangular assumes a parallel position to what is normally the ground plane G relative to the fixed position of the shaft 26. As seen in FIGS. 4 and 6, the pointer 79 is feed perpendicular to a back face of the plate 40. The pointer 79 includes a bore through which the bolt 52 extends. A marked notched portion 80 of end 82 is provided to aid in determining lie of the club head C. In this regard, fixedly connected to the block 30 is another plate 84 which generally lies in a plane parallel to a plane in which the pointer 79 moves. A spacer 81 of a plastic material, for example, can be adhered to a back surface of the pointer 79 to aid the slidability between the plate 84 and pointer 54. Degree markings are provided within the portions 86 and 88 which are equidistantly spaced from a centerline 90 which lies through the middle of the plate 84 perpendicular to the shaft 26. When the device 10 is disposed as previously described with respect to loft the pointer 79 which extends from the back of the plate 40 can enable a lie measurement to be taken from the plate 84 via the notched marked portion 80. To accommodate the reading of right-handed clubs, the shaft 26 and block 14 and 30 are marked with an "R" to denote the setup position for right-handed clubs as in FIG. 7. Although not shown on all drawings, a marking "L" as is shown in FIG. 4 is symmetrically placed 180 degrees on an opposite side of each part so that removal and reversal of attachment of such parts permits left-handed club measurements.

While in the foregoing specification a detailed description of a specific embodiment of the invention was set forth for the purpose of illustration, it will be understood that many of the details herein given may be varied considerably by those skilled in the art without departing from the spirit and scope of the invention.

What is claimed is:

1. A device for measuring bounce, loft and lie of a golf club, which includes:
   means for registering a golf club in a registration position;
   a bounce measurer operably associated with said means for registering to enable a bounce measurement to be taken from the club;
   a loft measurer operably associated with said means for registering to enable a loft measurement to be taken from the club; and
   a lie measurer operably associated with said means for registering to enable a lie measurement to be taken from the club.

2. The device of claim 1, wherein said bounce measurer is connected to said loft measurer.

3. The device of claim 1, wherein said lie measurer is connected to said bounce measurer.

4. The device of claim 1 wherein said means for registering includes an alignment piece configured to be disposed adjacent a face of the golf club and to extend in a predetermined angle therefrom to create a point of registration.

5. The device of claim 4, wherein said loft measurer includes a measuring surface adjustably disposed to a shaft of the club and has a plurality of incrementally spaced markings indicating a degree of loft angle arid a pointer operably associated with said measuring surface such that when a first end of said pointer aligns with said registration point a second end of said pointer is disposed adjacent one of sad markings indicative of loft angle.

6. The device of claim 4, wherein said alignment piece extends perpendicular from the club face and includes at least two 90 degree sides.

7. The device of claim 4, wherein said alignment piece includes at least one side includes a magnetic portion.

8. The device of claim 4, wherein said lie measurer includes a measuring surface adjustably disposed to the club and having a plurality of incrementally spaced markings indicating a degree of lie angle and a pointer operably associated with said measuring surface such that when a first end of said pointer aligns with said registration point a second end of said pointer is disposed adjacent one of said markings indicative of lie angle.

9. The device of claim 1, wherein said bounce measurer is adjustably disposable adjacent a predetermined point of a sole of the club wherein said predetermined point is determined by a bounce edge and a bounce contact point.

10. The device of claim 1, wherein said device includes an ability to perform said measurements on right and left handed clubs.

11. The device of claim 1, which further includes means interconnecting said means for registering and at least one of said measurers to permit an adjustably fixable position with respect thereto such that said measurer can be moved into a desired fixed position with respect to the club.

12. The device of claim 1, wherein said bounce measurer includes a measuring surface adjustably disposed with respect to the club and having a plurality of incrementally spaced markings indicating a degree of bounce angle and a bounce pointer operably disposed adjacent said measuring surface such that when a first end of said pointer is adjacent a predetermined bounce point of the club a second end of said pointer is disposed adjacent one of said markings indicative of bounce angle.

13. The device of claim 12, wherein said pointer includes a plurality of incrementally spaced markings indicating distance therebetween so that a distance between a leading bounce edge of the club and bounce contact point of the club can be obtained to provide a bounce width.

14. The device of claim 13, wherein said pointer includes a pair of bars slidably connected to said pointer which can be longitudinally displaced and aligned adjacent one of the bounce edge and bounce contact point of the club.

15. A device for measuring bounce of a golf club, which includes:
   a means for registering the golf club in a registration position; and
   a bounce measurer operably associated with said means for registering and adjustably disposable adjacent a predetermined point of a sole of the club wherein said predetermined point is determined by a bounce edge and a bounce contact point.

16. The device of claim 15, wherein said means for registering includes an alignment piece configured to be disposed adjacent a face of the golf club and to extend in a predetermined angle therefrom to create a point of registration.

17. The device of claim 16, wherein said alignment piece extends perpendicular from the club face and includes at least two 90 degree sides.

18. The device of claim 16, which further includes a lie measurer operably associated with said means for registering to enable a lie measurement to be taken.

19. The device of claim 18, wherein said lie measurer includes a measuring surface adjustably disposed to the club and having a plurality of incrementally spaced markings indicating a degree of lie angle and a pointer operably associated with said measuring surface such that when a first end of said pointer aligns adjacent to said registration point a second end of said pointer is disposed adjacent one of said markings indicative of lie.

20. The device of claim 16, which further includes a loft measurer operably associated with said means for registering to enable a loft measurement to be taken.

21. The device of claim 20, wherein said loft measurer is operably associated with said means for registering.

22. The device of claim 20, wherein said bounce measurer is connected to said loft measurer.

23. The device of claim 20, wherein said loft measurer includes a measuring surface adjustably disposed to the club and has a plurality of incrementally spaced markings indicating a degree of loft angle and a pointer operably associated with said measuring surface such that when a first end of said pointer aligns with said registration point a second end of said pointer is disposed adjacent one of said markings indicative of loft angle.

24. The device of claim 15, wherein said device includes an ability to perform said measurements on right and left handed clubs.

25. The device of claim 15, wherein said bounce measurer is movably connected to said means for registering such that said bounce measurer can be moved into contact with the sole of the club.

26. The device of claim 15, wherein said bounce measurer includes a measuring surface adjustably disposed with respect to the club and having a plurality of incrementally spaced markings indicating a degree of bounce angle and a bounce pointer operably disposed adjacent said measuring surface such that when a first end of said pointer is adjacent a predetermined bounce point of the club a second end of said pointer is disposed adjacent one of said markings indicative of bounce angle.

27. The device of claim 26, wherein said pointer includes a plurality of incrementally spaced markings indicating distance therebetween so that a distance between a bounce edge of the club and bounce contact point of the club can be obtained to provide a bounce width.

28. The device of claim 27, wherein said pointer includes a pair of bars slidably connected to said pointer which can be longitudinally displaced and aligned adjacent one of the bounce edge and bounce contact point of the club.

29. A method for measuring bounce of the golf club, which includes the steps of:

positioning a head of the golf club, according to claim 15, in a manner to gain access to the sole thereof;

determining a bounce measuring point between the leading bounce edge of the sole and the bounce contact point of the sole; and positioning the bounce measuring device adjacent said bounce measuring point where upon so positioning a bounce angle is provided.

30. The method of claim 29, which is further characterized by positioning the bounce measuring device square to horizontal of a face of the club.

31. A method for measuring loft of the golf club, which includes the steps of:

positioning a head of the golf club, according to claim 23, in a manner to gain access to the face thereof;

positioning the alignment piece adjacent the face of the golf club to extend in the predetermined angle therefrom to create the point of registration where upon so positioning a loft angle is provided.

32. A method for measuring lie of the golf club, which includes the steps of:

positioning a head of the golf club, according to claim 28, in a manner to gain access to the face thereof;

positioning the alignment piece adjacent the face of the golf club to extend in the predetermined angle therefrom to create the point of registration; and aligning the lie measurer with said point of registration where upon so positioning a lie angle is provided.

33. A method for measuring bounce width of the golf club, which includes the steps of:

positioning a head of the golf club, according to claim 27, in a manner to gain access to the sole thereof;

determining the leading bounce edge of the sole and the bounce contact point of the sole; and positioning the bounce width measuring device adjacent said bounce measuring point where upon so positioning a bounce width is provided.

* * * * *